United States Patent [19]
Cannon et al.

[11] 4,137,423
[45] Jan. 30, 1979

[54] NUCLEAR INSTRUMENTATION CABLE END SEAL

[75] Inventors: Collins P. Cannon; Donald P. Brown, both of Richland, Wash.

[73] Assignee: The United States of America as represented by the United States Department of Energy, Washington, D.C.

[21] Appl. No.: 861,132

[22] Filed: Dec. 16, 1977

[51] Int. Cl.² .......................................... H02G 15/22
[52] U.S. Cl. .................................. 174/19; 174/75 C; 174/77 R; 174/80
[58] Field of Search ............... 174/19, 20, 74 R, 75 C, 174/77 R, 80, 152 GM

[56] References Cited
U.S. PATENT DOCUMENTS

| 2,767,288 | 10/1956 | Lennon | 174/77 R X |
| 3,854,827 | 12/1974 | Merz et al. | 174/152 GM X |

*Primary Examiner*—Thomas J. Kozma
*Attorney, Agent, or Firm*—Dean E. Carlson; R. E. Constant

[57] ABSTRACT

An improved coaxial end seal for hermetically sealed nuclear instrumentation cable exhibiting an improved breakdown pulse noise characteristic under high voltage, high temperature conditions. A tubular insulator body has metallized interior and exterior surface portions which are braze sealed to a center conductor and an outer conductive sheath. The end surface of the insulator body which is directed toward the coaxial cable to which it is sealed has a recessed surface portion within which the braze seal material terminates.

7 Claims, 2 Drawing Figures

FIG. 2

NUCLEAR INSTRUMENTATION CABLE END SEAL

The present invention was made under U.S. Government Contract Number E(45-1)2170.

BACKGROUND OF THE INVENTION

The present invention relates to an end seal for nuclear instrumentation cable in which coaxial cable is hermetically sealed and terminated by the end seal. There is a need for instrumentation cables which can operate in the high temperatures and high voltages conditions of a liquid metal fast breeder reactor for in-vessel sensors. At the present time test setups have had to use a cooled thimble design to keep the cable at a relatively low temperature.

The key difficulty in developing instrumentation cable assemblies capable of operation at elevated temperature and voltage is the problem of breakdown pulse noise. Breakdown pulse noise is caused by small electrical discharges, with a charge content of approximately 10-13 coulombs, which occur across ceramic insulators at elevated temperature when high dc voltages are applied. This electrical noise prevents the acceptable operation of the nuclear instrumentation sensor, which can be a radiation flux detector. The component most susceptible to breakdown pulse noise has been the coaxial cable end seal.

The instrumentation cable is a coaxial design with a conductive tubular sheath, a metal oxide insulator within the tubular sheath, and a conductive center wire. The cable is typically subjected to a high pressure of an insulating gas such as nitrogen when the cable is hermetically sealed at the end seal. The hermetic end seal protects the interior of the cable from moisture and other contamination, and maintains the fill gas within the cable, which is especially critical for reliable operation of fission chamber detectors to which the cable is connected.

The end seals used to date are of a coaxial design in which a ceramic insulator body is disposed within and braze sealed to a conductive tubular sheath which is braze sealed or welded to the cable sheath. A center conductor also passes through and is sealed to the ceramic insulator body, which center conductor is connected to the cable center wire. There is a gas filled chamber defined between the end of the cable insulator and the end seal ceramic insulator body. The ceramic body has metallized surface portions to permit the braze sealing.

The temperature and voltage ratings for such end seals have been improved by providing steps or convolutions in the ceramic face, and by controlling the angle of the ceramic face to effect the breakdown pulse noise characteristics.

It has been discovered by the present inventors that breakdown pulse noise originates primarily at the end seal surface where the ceramic face, the conductive sheath or center wire, and the fill gas atmosphere are present at a "triple point" junction. Since the center wire carries the high voltage signal the problem is more serious at the center wire, ceramic face, fill gas, "triple point" junction. The braze seal which is made at this "triple point" junction sealing the metallized ceramic surface to the center wire or the outer tubular sheath, is subjected to a high voltage radial field, which apparently causes some electron emission and secondary emission along the face of the ceramic extending in the radial direction.

SUMMARY OF THE INVENTION

A nuclear instrumentation cable end seal structure has been developed which inhibits breakdown pulse noise within the operating voltage and temperature range of the end seal. The end surface of the insulator body portion of the end seal which is to be braze sealed to the center conductor and the outer conductive sheath has an axial recessed surface portion, with the radial gap between the conductor and the insulated axial recessed surface portion being sufficient that the fill gas does not breakdown to form a discharge. The braze between the metallized insulator surface and the conductor is confined within the recess and terminates at the insulator axial surfaces. The "triple point" junction between the ceramic insulator, the conductor and the fill gas thus occurs at the recessed axial surface of the insulator where no electric field lines exist parallel to the axial surface. Thus, there are no field emitted electrons accelerated in the axial direction.

The recessed axial surface portion can be provided at both the center wire braze seal area and at the outer sheath braze seal area.

The minimum radial gap for the axial surface for operation at up to about 1000 volts dc and 700° C., and conventional insert fill gas has been found to be about 0.010 inch.

DESCRIPTION OF THE PREFERRED EMBODIMENTS

Figure 1:
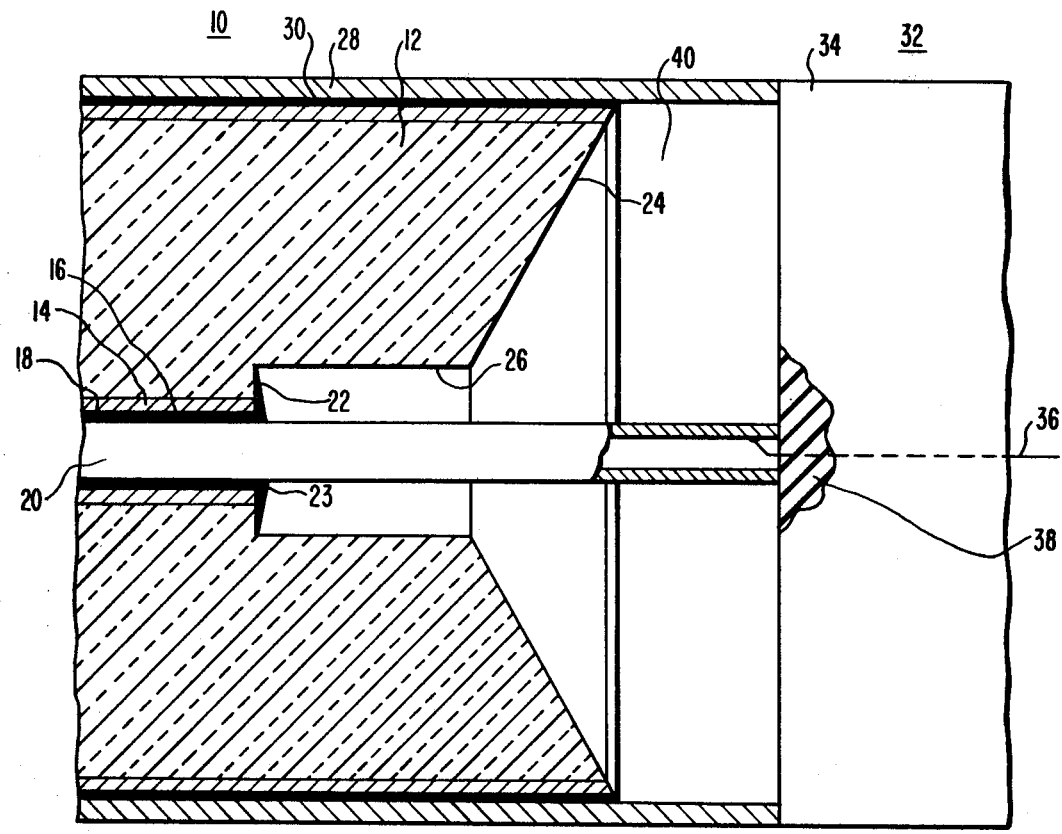
FIG. 1 is a side elevation view partly in section of the end seal structure of one embodiment of the present invention.
Figure 2:
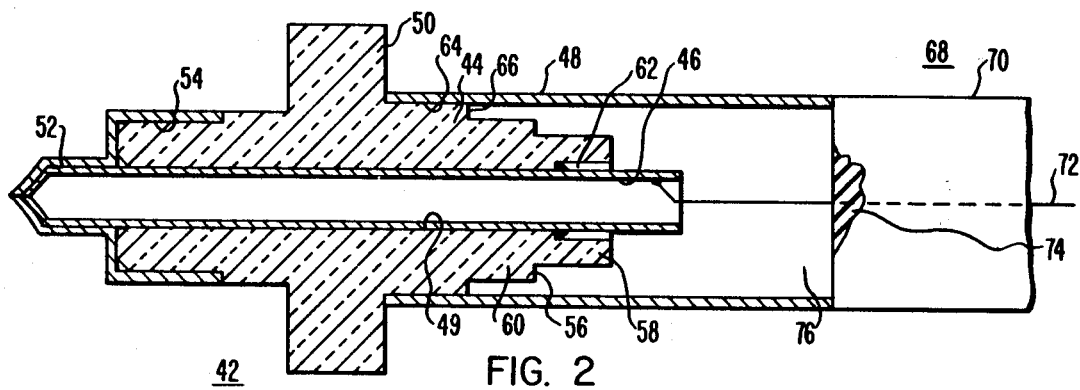
FIG. 2 is a side elevation view partly in section of another embodiment end seal structure of the present invention.

The invention can be best understood by reference to the embodiments shown in FIGS. 1 and 2. In FIG. 1, the end seal 10, includes a generally tubular insulator body 12 which is preferably high temperature stable and high voltage resistance ceramic material. The interior surface 14 of the insulator body 12 includes a uniform interior diameter portion 16 which has a metallized surface layer 18 disposed thereon. This metallized layer is deposited using conventional processes, such as the moly-manganese process. A central conductor 20 extends through the insulator body along its longitudinal axis and is brazed to the metallized surface 18 by a conventional brazing process.

The insulator body 12 also has a first radial surface portion 22 recessed from a second radial surface portion 24 which is the end surface of the end seal facing the coaxial instrumentation cable to which it is sealed. An axial surface portion 26 extends between the first and second radial surfaces 22 and 24, about the central longitudinal axis of the body 12. A recessed gap volume is thus defined about the center conductor 20 between the first and second radial surface portions of the end seal, with a braze fillet 23 sealed to and extending from the center conductor 20 along the first radical surface 22 and terminating at the axial surface portion 26. A tubular conductive outer sheath 28 is disposed about and braze sealed to the metallized exterior surface 30 of the insulator body 12.

The coaxial instrumentation cable 32 is seen at the right of FIG. 1, and comprises a conductive outer sheath 34, a center wire 36, and insulating means 28 disposed between the center wire 36 and the outer sheath. The cable center wire 36 is electrically connected to the end seal center conductor 20, and the cable sheath 34 is electrically connected to and hermetically sealed to the end seal outer sheath 28.

When the end seal 10 is joined to the cable 32, a fill gas containing volume 40 is defined between the end surface of the end seal and the end of the cable insulation. During fabrication and sealing, inert fill gas such as nitrogen fills the cable 32, and fill gas containing volume 40 typically at atmospheric pressure and up to several hundred pounds per square inch. The cable insulation 38 is typically highly compacted alumina. The central conductor 20 of the end seal 10 is preferably tubular and the fill gas may be introduced through this tubular conductor 20 which is sealed off at the other end of the end seal, as is conventional with prior art end seals.

The radial gap dimension between the central conductor 20 and the axial surface portion 26 should be sufficient for the particular operating voltage and inert fill gas to eliminate any gas discharge breakdown. For the embodiment shown, with up to about 1000 volts dc on the center conductor, and a nitrogen inert fill gas at about 14 psi, a radial gap or spacing of about 0.010 inch or more was found sufficient.

The axial dimension of the axial surface 26 is not critical and could typically be about 0.1 inch diameter.

The second radial surface portion 24 is also preferably concave relative to the fill gas containing volume 40 to further reduce the chance of generating breakdown pulse noise.

Another embodiment of the present invention is shown in FIG. 2, wherein the end seal 42 is seen in greater detail. In this embodiment the braze seal at the "triple point" junction between the end seal outer sheath and the exterior metallized surface on the insulator body is also disposed in a recessed gap to further eliminate any breakdown pulse noise.

The end seal 42 includes an insulator body 44, a tubular center conductor 46 passing through the insulator body 44 along its longitudinal axis, and a conductive tubular outer sheath 48. The interior surface 49 of the insulator body 44 is metallized and the center conductor 46 is braze sealed to this metallized surface 49. The insulator body 44 has an enlarged diameter center portion 50 which extends beyond the outer sheath 48 to provide an insulated termination end. A conductive end cap 52 is brazed onto metallized exterior surfaces 54 of the insulator body, and also braze sealed to the tubular center conductor 46. When sealed to the instrumentation cable 68 seen at the left of FIG. 2, the tubular center conductor 46 is tipped off at the end cap and hermetically sealed as illustrated by the dotted line tip-off seal in FIG. 2.

The other end surface 56 of the insulator body 44 has a plurality of annular stepped portions 58 and 60. The first annular portion 58 is the furthest extending portion of the end surface 56, and is spaced by a radial gap of at least 0.01 inch from the center conductor 46. The interior surface 49 of insulator body 44 is only metallized as far as the radially extending portion 62 so that the braze material again terminates with a braze fillet which is against the radially extending portion extending radially out as far as the annular portion 58. The end of the braze fillet against the annular portion 58 is not subject to a high radial electric field and field emission therefrom is suppressed or eliminated. The second annular portion 60 is spaced from the outer conductive sheath 48 providing a recess radial gap of at least about 0.01 inch between the exterior annular surface of another portion 60 and the sheath 48.

The exterior surface portion 64 of insulator body 44 is metallized and braze sealed to outer sheath 48, and a braze fillet extends along the radially directed surface 66 terminating at the annular portion 60. This insures that the "triple point" junction for the insulator, the braze and the gas fill is again in a recessed gap where it is not subject to a radial electric field.

The coaxial instrumentation cable 68 is shown at the left of FIG. 2. The coax outer conductive sheath 70 is braze sealed to the end seal sheath 48, and the coax center wire 72 is electrically connected to the tubular center conductor 46. The cable insulator 74 is spaced from the end surface 56 of the insulator body 44 with the fill gas occupying the defined volume 76.

It may be desirable to also provide a recessed gap "triple point" junction at the end cap seal area to the metallized surface 54 of the ceramic body to further ensure against any breakdown. A radial step can be provided in the ceramic body and an axial surface portion spaced from the end cap.

We claim:

1. A high voltage, high temperature coaxial end seal for hermetically sealed nuclear instrumentation cable which exhibits an improved breakdown pulse noise characteristic, which end seal comprises a generally tubular insulator body portion with selected portions of the interior and exterior surfaces of the tubular insulator body being metallized, a conductive central tube passing through the tubular insulator and sealed thereto, an outer conductive sheath disposed about one end of the tubular insulator and sealed thereto, with a conductive end cap disposed about the other end of the tubular insulator and sealed to the metallized exterior surface of the tubular insulator and the conductive central tube, and wherein the other end surface of the tubular insulator body has a first radial surface portion of a predetermined minimum dimension extending from the tubular insulator body interior surface to an axial surface portion coaxial about the conductive central tube, with a second radial surface portion extending from the axial surface portion to the tubular insulator body exterior surface, with the radial and axial surface portions free of metallized layer, and wherein sealing braze material is provided between the conductive central tube and the metallized interior surface of the tubular insulator body with the braze material terminating along the first radial surface portion.

2. The coaxial end seal set forth in claim 1, wherein the second radial surface portion extends outward to a second axial surface portion spaced a predetermined minimum dimension from the outer sheath, with a third radial surface portion extending this predetermined minimum dimension from the second axial surface portion to the junction of metallized exterior surface of the insulator body and the outer sheath sealed thereto.

3. The coaxial end seal set forth in claim 1, wherein the predetermined minimum dimension for the first and third radial portions is at least about 0.01 inch.

4. The coaxial end seal set forth in claim 1, wherein the tubular insulator body includes an enlarged diameter central portion which extends outward beyond the outer sheath, which enlarged diameter central portion insulates the outer sheath from the end cap.

5. The coaxial end seal set forth in claim 1, wherein the insulator body is ceramic.

6. The coaxial end seal set forth in claim 1, hermetically sealed to a coaxial instrumentation cable, with the cable and end seal filled with nitrogen at about 300 pounds per square inch pressure.

7. An insulator-to-metal hermetic end seal structure for use with coaxial instrumentation cable subject to high voltage and high temperature which end seal structure comprises a generally tubular insulator body with a central passage provided through the insulator body along the longitudinal axis of the body, a metallized layer provided on the interior surface of the central passage and on the exterior surface of the insulator body, a central conductor exterior surface of the insulator body, a central conductor disposed within the central passage braze sealed to the metallized interior surface of the passage and a tubular metal outer sheath about and braze sealed to the metallized exterior surface of the insulator body, wherein the end surface of the insulator body facing the end of the coaxial instrumentation cable to which it is sealed has a radial portion and a stepped axial recess portion at the interior surface about the center conductor providing a predetermined gap between the center conductor and the stepped axial recess with a braze seal provided between the center conductor and the metallized interior surface of the insulator body which braze seal terminates at the axial recess portion of the tubular insulator body, and the predetermined gap between the center conductor and the axial recess portion is at least 0.01 inch.

* * * * *